Sept. 15, 1931.   H. T. HUNTER   1,823,146
COOKING APPARATUS
Filed June 13, 1929   6 Sheets-Sheet 1
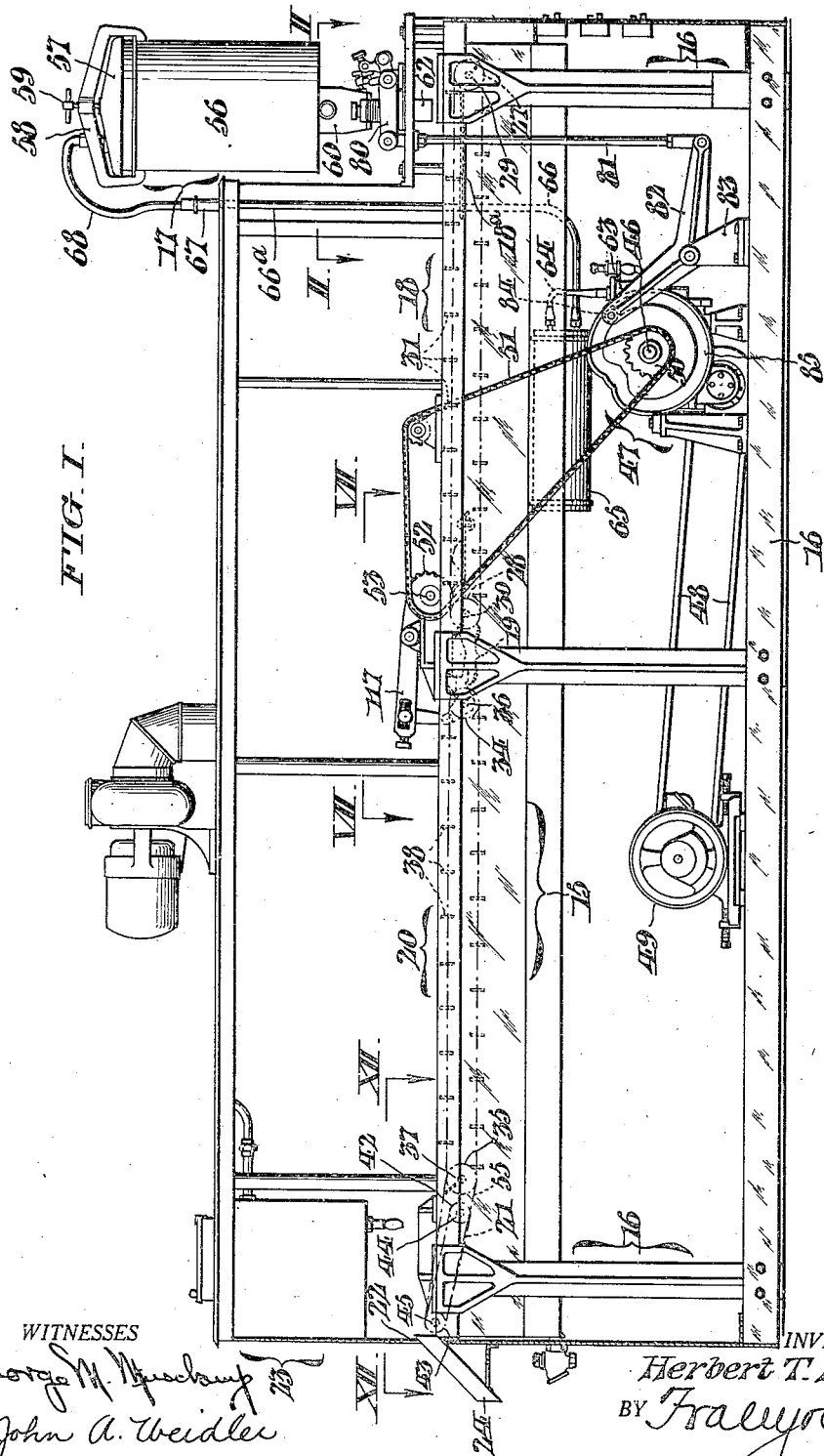

Sept. 15, 1931.  H. T. HUNTER  1,823,146
COOKING APPARATUS
Filed June 13, 1929    6 Sheets-Sheet 2
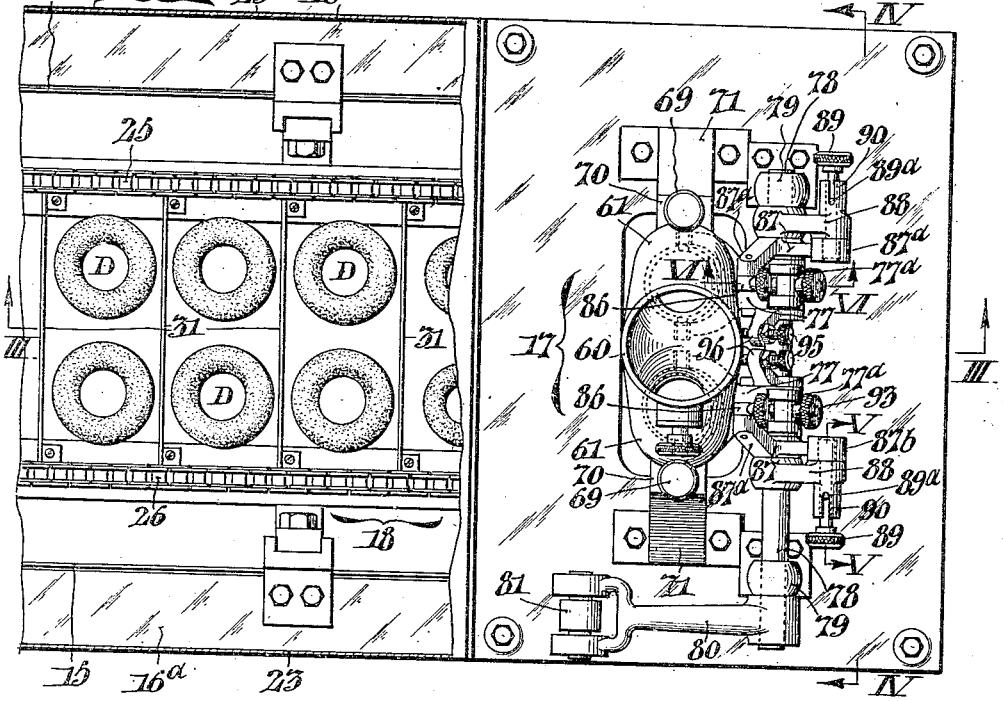
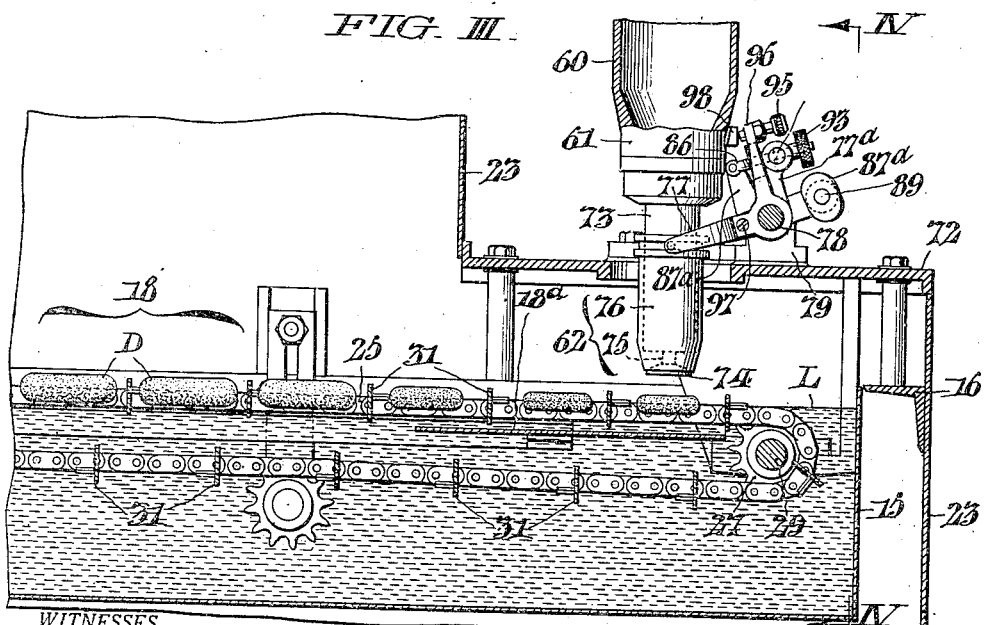

Sept. 15, 1931.   H. T. HUNTER   1,823,146
COOKING APPARATUS
Filed June 13, 1929   6 Sheets-Sheet 3
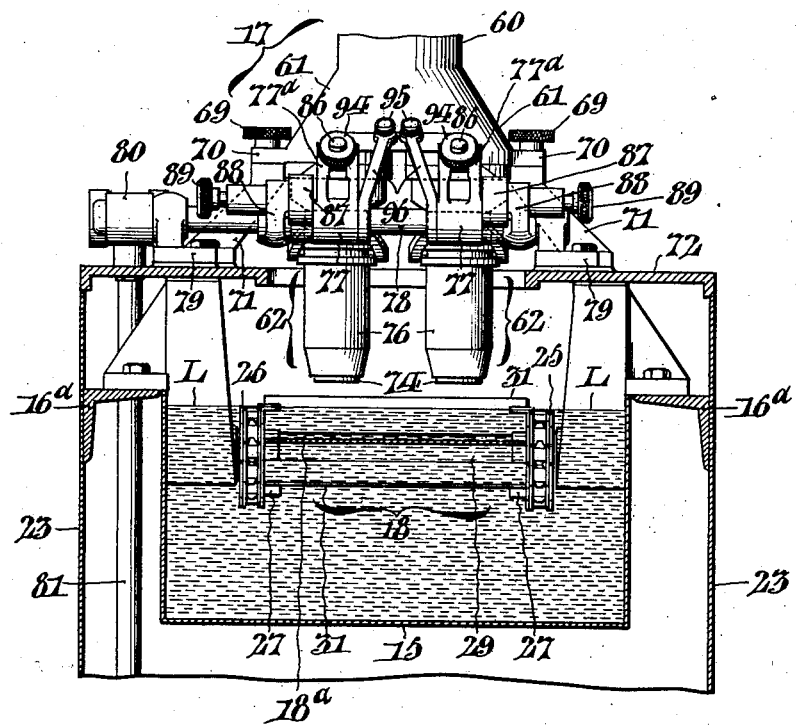
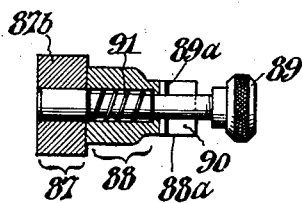
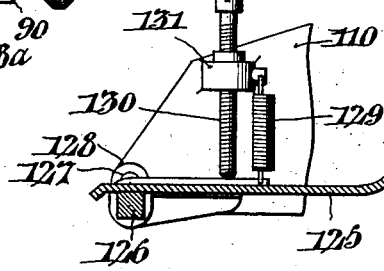
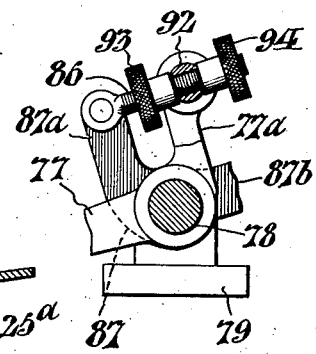
WITNESSES
INVENTOR:
Herbert T. Hunter
BY
ATTORNEYS.

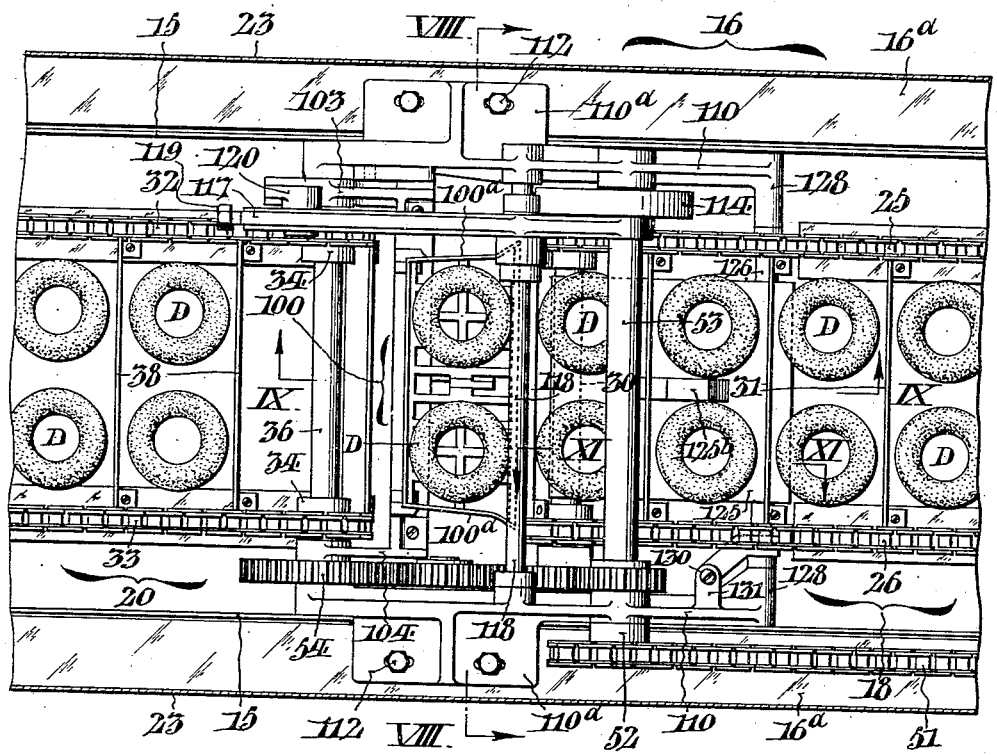
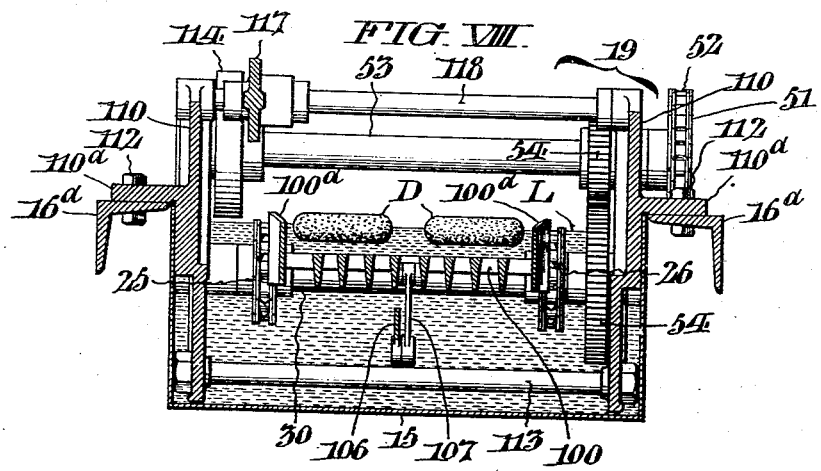

Sept. 15, 1931. H. T. HUNTER 1,823,146
COOKING APPARATUS
Filed June 13, 1929  6 Sheets-Sheet 5
FIG. XII.
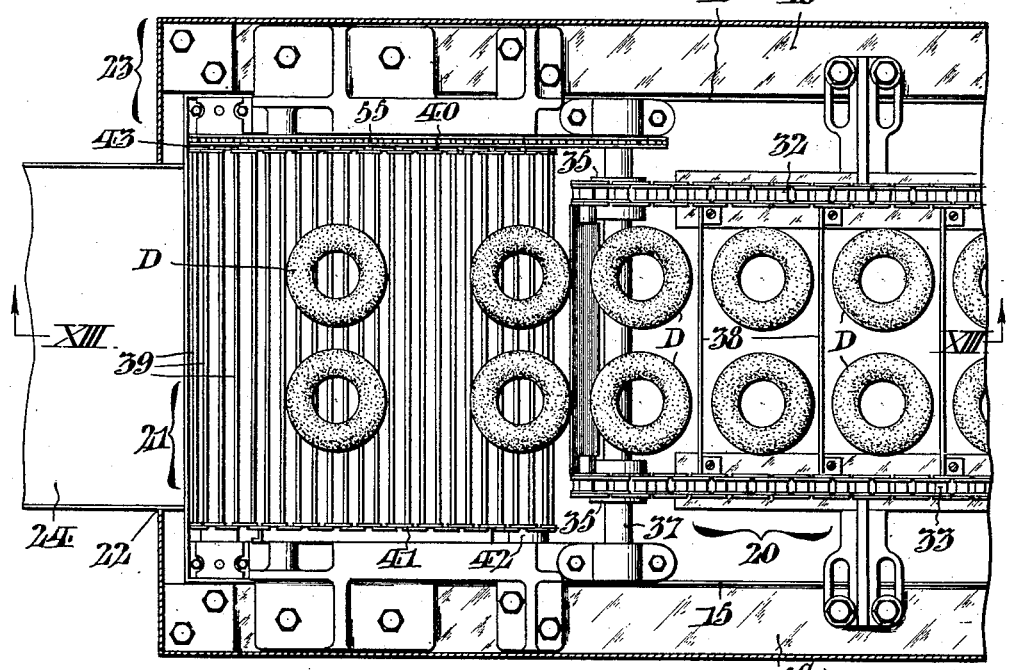
FIG. XIII.
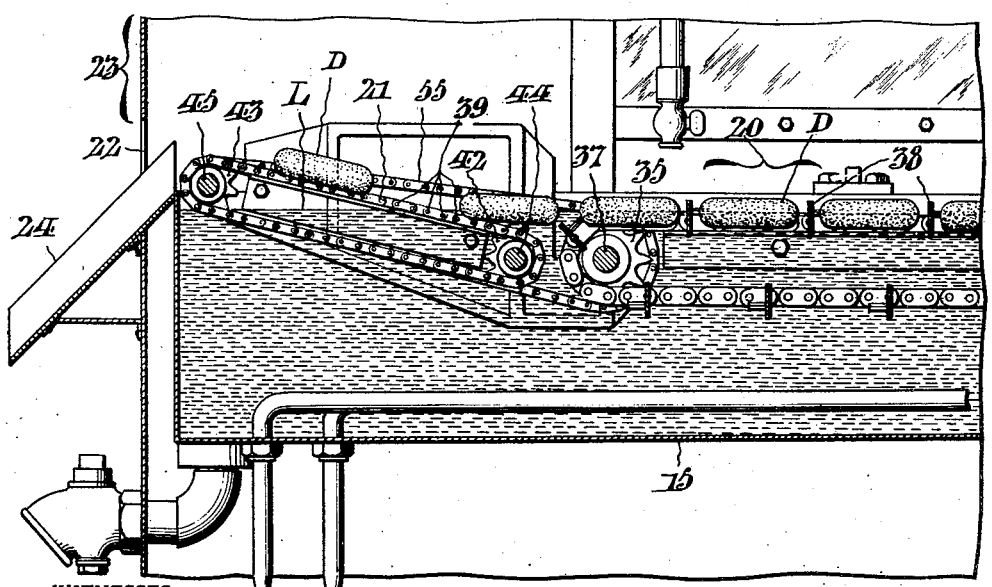
WITNESSES
INVENTOR:
Herbert T. Hunter
BY
ATTORNEYS.

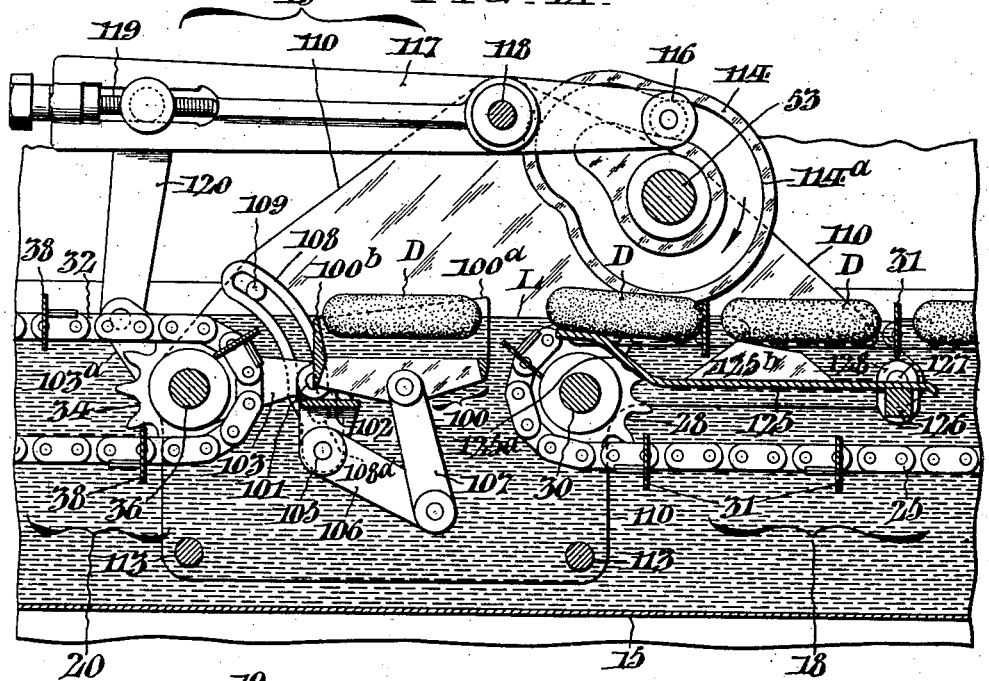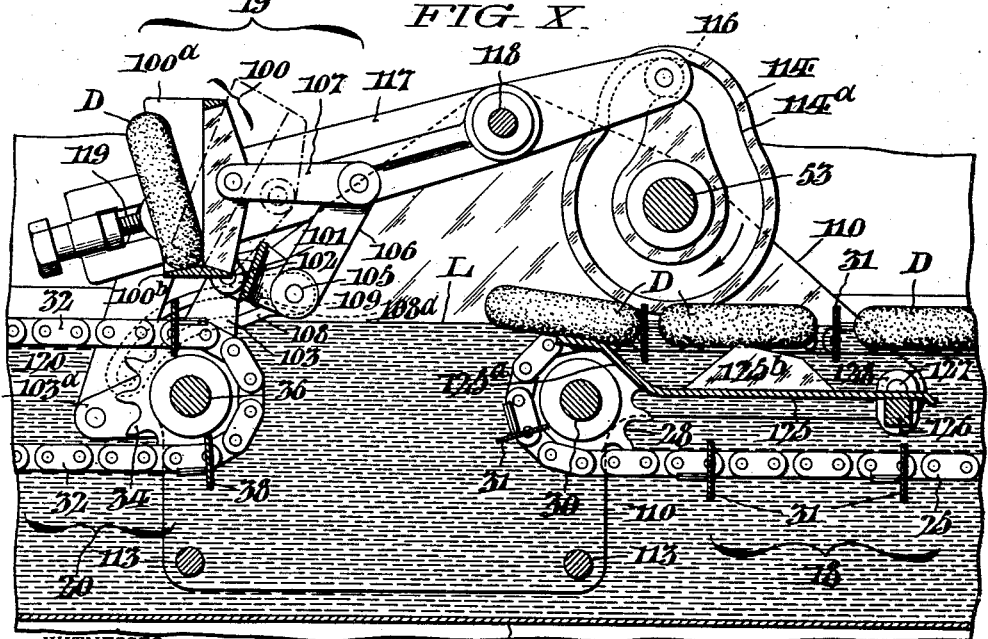

Patented Sept. 15, 1931

1,823,146

UNITED STATES PATENT OFFICE

HERBERT T. HUNTER, OF CATONSVILLE, MARYLAND, ASSIGNOR TO DOUGHNUT MACHINE CORPORATION, OF NEW YORK, N. Y., A CORPORATION OF NEW YORK

COOKING APPARATUS

Application filed June 13, 1929. Serial No. 370,559.

This invention relates to apparatus for automatically cooking doughnuts and the like with hot liquor, and has more particular reference to cooking apparatus or machines of the straight-away type exemplified in U. S. Patent No. 1,320,662, granted to Walter H. Tomlinson under date of November 4, 1919 and designed for continuously cooking flat annular or ring doughnuts in large quantities.

In connection with machines of the kind referred to I aim to provide means whereby positive control is had of the doughnuts individually, i. e. either singly or in rows or groups, incident to continuous progression in the cooking liquor as the cooking proceeds, as well as during manipulation at the time when the doughnuts are turned over in the liquor after having been cooked on one of their sides, for completion of the cooking of their other sides, all to the end of insuring against clogging of the apparatus and possible deformation of the doughnuts in the partially cooked state.

Another object of my invention is to provide, in connection with such machines, improved forming mechanism having a number of duplicate die means capable of simultaneous operation at each actuation in successively releasing rows of doughnuts to drop transversely of the receptacle containing the cooking liquor; and to further provide facilities whereby any one or more of the forming die means may be rendered idle to the exclusion of others in controlling the output of the apparatus or for other purposes.

Still other objects and attendant advantages will appear in the course of the detailed description which follows when taken in connection with the attached drawings, whereof Fig. I is an illustration partly in side elevation and partly in longitudinal section of a cooking apparatus conveniently embodying my invention.

Fig. II is a fragmentary plan view on a larger scale of the receiving end of the machine, taken as indicated by the arrows II—II in Fig. I.

Fig. III is a longitudinal section, taken as indicated by the arrows III—III in Fig. II.

Fig. IV is a transverse section, taken as indicated by the arrows IV—IV in Figs. II and III, showing more particularly the details of the means by which the doughnuts are formed.

Figs. V and VI are detail sections, taken as indicated respectively by the arrows V—V and VI—VI in Fig. II.

Fig. VII is a fragmentary plan view of the medial portion of the apparatus, taken as indicated by the arrows VII—VII in Fig. I.

Fig. VIII is a transverse section, taken as indicated by the arrows VIII—VIII in Fig. VII.

Fig. IX is a longitudinal section of a portion of the apparatus shown in Fig. VII, and taken as indicated by the arrows IX—IX in that figure.

Fig. X is a view similar to Fig. IX with the parts shown in a different position.

Fig. XI is a detail section, taken as indicated by the arrows XI—XI in Fig. VII.

Fig. XII is a fragmentary plan view of the delivery end of the apparatus, taken as indicated by the arrows XII—XII in Fig. I; and, Fig. XIII is a longitudinal section, taken as indicated by the arrows XIII—XIII in Fig. XII.

As herein depicted, my improved cooking apparatus comprises an elongated rectangular receptacle 15 for cooking liquor L (Figs. III, IV, IX, X and XIII) which may be heated electrically or otherwise, said receptacle being supported at a convenient height by an open frame designated generally by the numeral 16 in Fig. I. Raw annular formations D of dough are successively released in transverse rows or groups, in the present instance in pairs, by a forming means 17 supported over the right hand end of the receptacle 15 (as considered in Fig. I) to drop into the cooking liquor L for progression afloat by a conveyor 18 to a point about midway of the length of said receptacle where a normally submerged means 19 (Figs. I, IX and X) intermittently operates to individually transfer them inverted to a second conveyor 20 for progression through the remainder of the receptacle in a manner more fully explained later. As shown in Figs. I, XII and XIII, the conveyor 20 delivers to an ejecting belt 21 by which the cooked doughnuts D are elevated from the liquor L and discharged through an opening 22 at the left hand end of a casing 23 that encloses the receptacle 15 onto a delivery chute 24.

Referring to Figs. II, III, VII and VIII, it will be observed that the conveyor 18 comprises a pair of endless sprocket chains 25, 26 which are trained about sprocket wheels 27, and 28, secured in spaced relation respectively to shafts 29, 30. These sprocket chains 25, 26 jointly support transverse vanes 31 which set apart individual cells, each capable of accommodating a transverse row of doughnuts D to maintain them in definite separation incident to progression afloat at the surface of the liquor L. A stationary plate 18a underlying the active run of the conveyor 18 in the vicinity of the forming means 17 prevents the raw doughnuts D from sinking below the vanes 31 and moreover sustains them until they become sufficiently buoyant to float at the surface of the liquor L. The second conveyor 20 (Figs. I, XII and XIII) likewise comprises a pair of sprocket chains 32, 33 that run over wheels 34, and 35, set in spaced relation on shafts 36, 37 respectively and support between them transverse vanes 38 that set apart cells to maintain the doughnuts D in separation exactly as described in connection with the conveyor 18. The ejecting belt 21 is similarly formed as an endless conveyor and constituted by a succession of closely spaced cross bars 39 that extend between sprocket chains 40, 41 wherefor the wheels 42, and 43, are mounted on shafts 44, 45 respectively.

The forming means 17, the progressing conveyors 18, 20, and the turnover means 19 all derive motion from a transmission shaft 46 of a speed reduction mechanism 47 located within the frame 16 beneath the cooking receptacle 15 at the right hand end of the apparatus, said mechanism being driven in the present instance through a belt connection 48 by an electric motor 49 also supported within the frame 16 beneath the receptacle 15. As shown in Fig. I, the transmission shaft 46 carries a sprocket pinion 50 which is coordinated, by means of a chain 51, with a sprocket wheel 52 on a shaft 53 which is supported above the receptacle 15, said shaft transmitting motion to the contiguous sprocket shafts 30, 36 of the conveyors 18, 20 through a train of gears 54 as shown in Figs. VII and VIII. The ratios of these gears 54 is such that the conveyors 18, 20 are progressed in synchronism and in definite timed relation with actuation of the forming means 17 and the transfer means 19 so that a pair of doughnuts D is released with presentation of each of the cells of the conveyor 18 and another pair of doughnuts D inverted and transferred from said conveyor to the second conveyor 20. The ejecting belt 21 derives its motion through a chain connection 55 that extends between its sprocket shaft 45 and the sprocket shaft 37 of the second progressing conveyor 20, see Figs. XII and XIII.

Referring now to Figs. I, II, III, and IV, the forming means 17 embodies a dough magazine 56 with a removable cover 57 which is held down fluid tight by means of a yoke 58 with a clamp screw 59. An outlet 60 at the bottom of the reservoir 56 has branches 61 fitted with separate die means 62 by which the doughnuts D are individually formed. The dough is extruded from the reservoir 56 under the action of compressed air supplied by a generating system whereof the pump 63 derives motion from the speed reduction mechanism 47 and delivers through a pipe 64 into a pressure equalizing tank 65. From this tank 65 the air is conducted by way of another pipe 66 with a vertical branch 66a to a fitting 67 at the top of the enclosure 23, said fitting affording a nipple for connection of a flexible hose 68 which extends to a similar nipple on the cover 57 of the dough magazine 56. As shown in Figs. II–IV, the magazine outlet 60 is removably secured by thumb screws 69 which pass through end lugs 70 and engage brackets 71 upstanding from a supporting plate 72 overlying the receiving end of the receptacle 15. The raw doughnuts D are shaped through expulsion of the dough through annular openings between the bottom edges of depending tubular prolongations 73 of the dough magazine outlet branches 61, and coaxial disks 74 suspended by stems 75 from within said prolongations, the extrusions being severed through intermittent reciprocation of cutting sleeves 76. These sleeves 76 are guided for up and down movement on the outlet prolongations 73, and are individually actuated by yoke levers 77 on a rock shaft 78 with journal support in bearings 79 on the top of the plate 72. The rock shaft 78 receives motion from the transmission shaft 46 of the mechanism 47 through connection of an arm 80 thereon by a rod 81 with one extremity of a lever 82 fulcrumed centrally on a fixed bracket 83 on the machine frame 16, the other extremity of said lever carrying a roller 84 which runs in the face groove of a rotary cam 85 on the transmission shaft, all as shown in Fig. I. Thus with each rotation of the transmission shaft 46, the forming mechanism 17 is actuated once to release a pair of raw doughnuts D into a cell of the conveyor 18. In order that either or both the die means 62 may be rendered idle at will during operation of the apparatus, I make provisions as follows: The yoke levers 77 are loose on the shaft 78 and formed with upward extremities 77a (Figs. II-VI) which are coupled by links 86 (capable of adjustment in a manner explained presently), with corresponding extremities 87a of bell cranks 87 likewise loose on said shaft and interposed between the yoke levers 77 and arms 88 fixed to the shaft 78. In bosses 88a at their outer ends, the arms 88 carry retractable spring pressed clutch pins 89 which are adapted to normally engage apertures in the horizontal extremities 87b of the bell cranks 87, the extent of projection of said clutch pins being determined by cooperation of lateral lugs 89a on them with slots 90 in the bosses 88a. Upon withdrawing the clutch pins 89 in opposition to their springs 91 (Fig. V) and rotating the same so that the projections 89a engage the outer ends of the bosses 88a, said pins will be held retracted out of engagement with the bell cranks 87. Under this condition, the yoke levers 77 are permitted to remain quiescent with the cutter sleeves 76 in the lowered position and the annular die openings closed. The size of the extrusions is in part determined by the pressure maintained in the dough magazine 56 and in part by the width of the annular die openings, i. e. by the extent to which the cutter sleeves 76 are raised. In order that the lifting motion of the sleeves 76 may be regulated for the purpose indicated, I make provisions for varying the effective length of the links 86. which, to this end, are in the form of screw eyes with threaded shanks that pass through collars 92 (Fig. VI) pivotally engaged in bifurcations of the yoke arm 77a. The arrangement furthermore enables separate adjustment of the two cutter sleeves 76 for attainment of uniformity in the size of the dough rings released by them. The threaded shanks of the links 86 are engaged by adjustable nuts 93, 94 that jamb against opposite sides of the collars 92. The limit of descent of the cutter sleeves 76 is on the other hand regulatable by means of set screws 95 with capacity for adjustment in arms 96 secured to the yoke levers 77 by screws 97, and adapted to engage a stop bar 98 extending crosswise of the outlet 60. By the regulation described, the cutting edges of the sleeves 76 may be caused to overlap the cooperating cutter disks 74 to various extents until the proper shearing action is obtained to insure a clean release of the extruded annular formations.

Referring now more particularly to Figs. VII-X, the transfer mechanism 19 occupies an interval between the contiguous ends of the conveyors 18, 20 wherein the doughnuts D are free to float after release by the former of said conveyors, and as shown embodies a hand 100 of open grid-like construction with convergent upstanding side flanges 100a to confine the doughnuts D laterally, and a connecting transverse flange 100b designed to function as a stop for said doughnuts. This hand 100 is pivoted at 101 to the cross bar 102 of a frame with side arms 103, 104 that loosely engage on the sprocket shaft 36. The bar 102 also carries an axis 105, which, intermediate its ends, is fitted with an arm 106, the latter being coupled, by means of a link 107, with the hand 100 at the center. At one end the axis 105 has secured to it moreover, a slotted arcuate cam arm 108 in engagement with a fixed pin 109 that projects inward from one of a pair of side bearing plates 110 wherein the sprocket shafts 30, 36 are journalled. As shown, the bearing plates 110 are in the form of castings whereof the lateral pads 110a rest on the horizontal bars 16a of the machine frame 16. As shown in Figs. VIII-X the bearing plates 110 are secured to the frame bars 16a by bolts 112 and joined at appropriate intervals by cross tie rods 113. The transfer means 19 is directly actuated by a rotary cam 114 on the shaft 53 which it will be observed is also afforded journal support in the bearing plates 110, said cam having a face groove 114a to engage a roller 116 on one extremity of a compound lever 117. This lever 117 is fulcrumed on another shaft 118 that extends crosswise between the side bearing plates 110 at the top. The other extremity of the compound lever 117 is pivotally connected, with capacity for adjustment by means of a screw 119, to a link 120 which is in turn pivotally connected to a supplemental extremity 103a of the arm 103 previously mentioned. As shown in Fig. VIII, the hand 100 is normally submerged in the liquor L so that the doughnuts D are free to pass over the top of the same in readiness to be transferred and inverted. The rocking motion imparted to the compound lever 117 incident to rotation of the cam 114 is communicated, by the link 120 to the cross bar 102 connecting the arms 103, 104 and as a consequence, the hand 100 is swung upwardly about the shaft 36 as an axis to raise a pair of doughnuts D above the level of the liquor L in the receptacle 15. In this connection it is to be particularly noted that the curvature of the slotted arm 108 is concentric with the shaft 36, and, accordingly during the greater portion of its movement, the hand 100 operates in effect as a rigid part of the bracket 102 and swings bodily about the shaft 36 as just explained. However, as the hand 100 nears the upper limit of such bodily movement and reaches the position indicated in dot-and-dash lines in Fig. X, an offset portion 108a of the slot in the arm 108, by cooperation with the fixed pin 109, causes said hand to suddenly swing independently about the axis 101. The doughnuts D are accordingly given a flipping impetus which insures their inversion concurrently with definite placement into a contiguous cell of the conveyor 20.

During operation of the means 19 in transferring a pair of doughnuts D as just explained, the immediately succeeding pair of doughnuts D is temporarily restrained against continuing flotation by a means having the form of a plate 125 submerged in the cooking liquor L. This arresting plate 125 is secured to a cross bar 126 capable of rocking movement on trunnions 127 with support in bearings 128 afforded by the side bearing plates 110. A spring 129 (Fig. XI) exerts an upward pull on the plate 125 and tends to draw it into contact with a motion limiting stop screw 130 adjustable in a lug 131 on that side bearing plate 110 shown at the bottom of Fig. VII. The free edge of the arresting plate 125 is bent upwardly through an angle as at 125a and adapted to engage the doughnuts D from beneath as shown in Fig. IX in arresting them. Normally, however, the plate 125 is held depressed against the pull of the spring 129 by action of the overtravelling vanes 31 of the conveyor 18 upon the inclined portion 125a as well as upon a cam rise 125b centrally of said plate, in a manner obvious from Figs. IX and X. The check thus provided upon a following pair of doughnuts D during operation of the transfer means 19 prevents them from floating into the interval between the conveyors 18, 20 when vacated by the hand 100. Attention is herein directed to the fact that the time interval between transfer from the conveyor 18 to the conveyor 20 in practice is about two minutes and, in this way clogging of the apparatus and deformation of the doughnuts D is effectively precluded.

The construction of the transfer means 19 is unique in that it is in the form of a complete unit capable of being separately removed with all its parts from the frame 16 of the apparatus.

Having thus described my invention, I claim:

1. In apparatus for cooking flat or annular doughnuts and the like with hot cooking liquor, a pair of aligned conveying elements for progressing the doughnuts afloat but in definite separation in the cooking liquor; means temporarily restraining the doughnuts against continuing flotation at the inner end of the first conveying element; and means in an interval between the contiguous ends of the conveying elements for receiving the doughnuts successively released from the first conveying element to float free in the said interval, and transferring them inverted to the second conveying element.

2. In apparatus for cooking flat or annular doughnuts and the like with hot cooking liquor, a receptacle for the cooking liquor, a pair of aligned synchronously moving endless conveyors with cells for individually progressing the doughnuts through the receptacle afloat in the cooking liquor, and in definite separation; means temporarily restraining the doughnuts against continuing flotation at the inner end of the first conveying element; and intermittently operating means in an interval between the contiguous ends of the conveyors for receiving doughnuts as they are successively released from the cells of the first conveyor to float free in the said interval and individually transferring them inverted to the second conveyor.

3. In apparatus for cooking doughnuts and the like with hot cooking liquor, a receptacle for the cooking liquor; a pair of aligned progressing elements for conveying the doughnuts in succession through the receptacle afloat in the liquor; intermittently operated normally submerged means in an interval between the progressing elements aforesaid for transferring the doughnuts upon being released by the first progressing element to float free in the said interval to the second progressing element; and a submerged spring-influenced element effective to temporarily retard continuing flotation of the next succeeding doughnut during operation of the transfer means.

4. In apparatus for cooking doughnuts and the like with hot cooking liquor, a receptacle for the cooking liquor; a pair of serially arranged progressing elements for conveying the doughnuts in succession through the receptacle afloat in the liquor; intermittently operated normally submerged means in an interval between the progressing elements for individually transferring the doughnuts upon release by the first progressing element to float free in the said interval to the second progressing element; and means to temporarily retard the next succeeding doughnut against continuing flotation during operation of the transfer means by engaging it from beneath and lifting it slightly in the liquor.

5. In apparatus for cooking doughnuts and the like with hot cooking liquor, a receptacle for the cooking liquor; a pair of serially arranged progressing elements for conveying the doughnuts in succession through the receptacle afloat in the liquor; intermittently operated normally submerged means in an interval between the progressing elements for transferring the doughnuts upon release by the first progressing elements to float free in the said interval to the second progressing element; and means actuated by one of the progressing elements to temporarily retard the next succeeding doughnut against continuing flotation during operation of the transfer means.

6. In apparatus for cooking doughnuts and the like with hot cooking liquor, an elongated receptacle for the cooking liquor; a pair of aligned endless conveyors for progressing the articles in succession through the receptacle afloat in the liquor; intermittently operated normally submerged means in an interval between the contiguous ends of the conveyors for transferring the doughnuts upon release by the first conveyor to float free in the said interval to the second conveyor; and an upwardly-influenced rockable plate effective to temporarily retard continuing flotation of the next succeeding doughnut during each operation of the transfer means.

7. In apparatus for cooking doughnuts and the like with hot cooking liquor, an elongated receptacle for the cooking liquor; a pair of serially arranged endless conveyors for progressing the doughnuts through the receptacle afloat in the liquor, each such conveyor comprising a pair of endless sprocket chains supporting between them transverse bars to afford individual cells for the doughnuts; intermittently operated normally submerged means in an interval between the contiguous ends of the progressing conveyors for transferring the articles, upon release by the first conveyor to float free in the said interval, to the second conveyor; and means to temporarily retard continuing flotation of the next succeeding doughnut during each operation of the transfer means, said retarding means being actuated by the vanes of one of the conveyors.

8. In apparatus for cooking doughnuts and the like with hot cooking liquor, an elongated receptacle for the cooking liquor; a pair of serially arranged conveyors for progressing the articles in succession through the receptacle afloat in the liquor, each such conveyor comprising a pair of spaced endless chains supporting between them transverse vanes to afford individual cells for the doughnuts; intermittently operated normally submerged means in an interval between the progressing conveyors for transferring the articles upon release by the first conveyor to float free in the said interval, to the second conveyor; and a submerged plate to temporarily retard continuing progression of the next succeeding doughnut during each operation of the transfer means, said plate being pivoted along one edge and formed with a cam incline arranged to be engaged from above by the vanes of one of the conveyors to hold it normally depressed in opposition to a spring out of contact with the doughnuts.

In testimony whereof, I have hereunto signed my name at Ellicott City, Maryland, this 7th day of June 1929.

HERBERT T. HUNTER.